J. H. WAGENHORST.
WHEEL RIM.
APPLICATION FILED MAR. 8, 1919.
1,316,606. Patented Sept. 23, 1919.
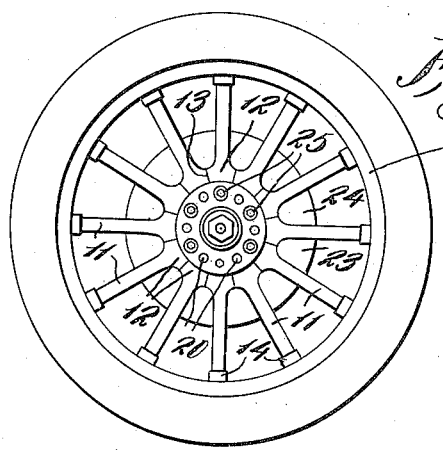
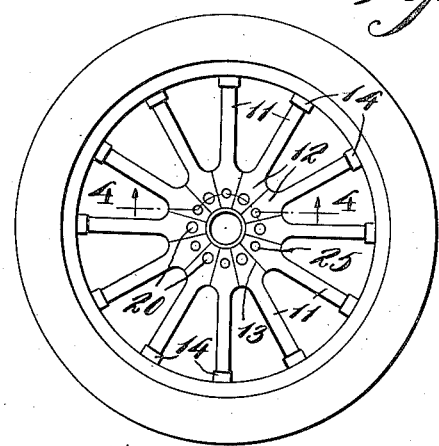
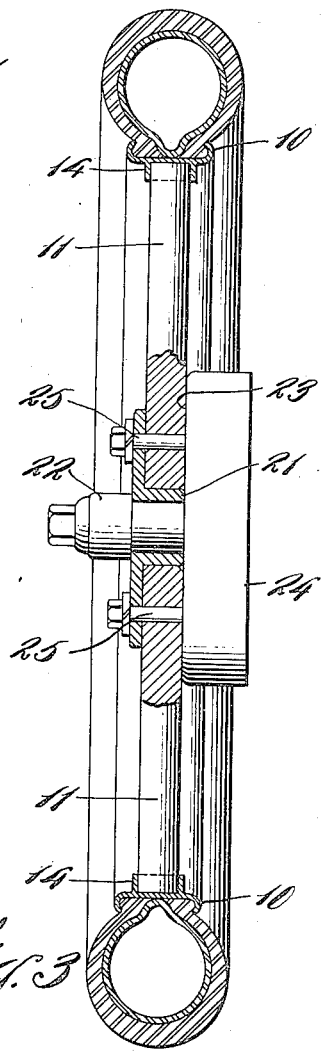
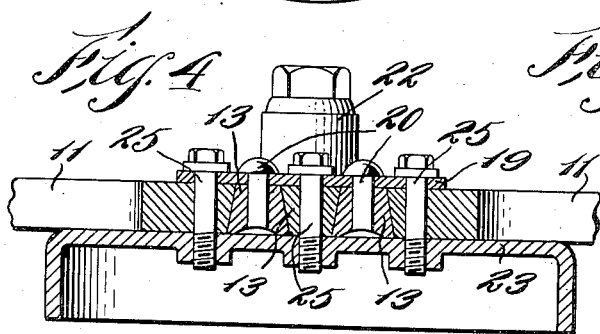
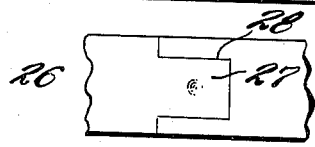
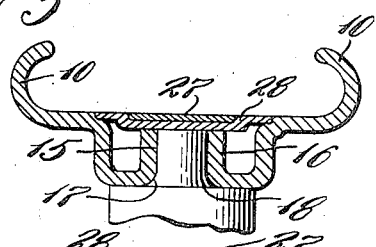
Inventor
James H. Wagenhorst.

UNITED STATES PATENT OFFICE.

JAMES H. WAGENHORST, OF AKRON, OHIO.

WHEEL-RIM.

1,316,606.           Specification of Letters Patent.     Patented Sept. 23, 1919.

Original application filed August 12, 1915, Serial No. 45,149. Divided and this application filed March 8, 1919. Serial No. 281,490.

*To all whom it may concern:*

Be it known that I, JAMES H. WAGENHORST, a citizen of the United States, residing at Akron, in the county of Summit and State of Ohio, have invented a certain new and useful Improvement in Wheel-Rims, of which the following is a full, clear, and exact description, reference being had to the accompanying drawings.
This invention relates generally to wheels and more particularly to a demountable wheel for automobiles and similar vehicles, this application being a division of my application for wheels filed August 12, 1915, Serial No. 45,149 and this divisional application has particular reference to the combined features of construction and operation pertaining to the tire retaining rim as a part of the wheel.
An object of the invention is to provide a wheel of exceedingly few parts so constructed and assembled as to effect a considerable saving in time, labor and material in the manufacture thereof.
A further object is to provide a wheel comprising a plurality of wooden spokes and a rim provided with means for protecting the tire from the projecting ends of the spokes, which extend through the central or base portion of the rim.

With these and other objects in view the invention consists in the novel features of construction hereinafter fully described and pointed out in the claims. In the drawings forming a part of this specification, Figure 1 is a face view of the wheel embodying my invention; Fig. 2 is a rear view of the same; Fig. 3 is a sectional view of the wheel attached to the hub; Fig. 4 is a sectional view showing bevel of spoke; Fig. 5 shows a modified form of rim, and Figs. 6 and 7 show details of construction.

In carrying out my invention I employ a rim 10, preferably of rolled sheet metal of a continuous unbroken circle and shaped to receive a clencher tire, but the rim can be made to receive a straight sided tire or a cushion tire.

This rim comprises the channeled inner portion and the integral tire retaining flanges.

The rim may also be described as comprising a base portion and legs or side portions, said legs or side portions having the integral tire retaining flanges extending outwardly therefrom.

By making the rim integral and applying the same to a plurality of wooden spokes, the weight of the wheel is materially reduced and a strong and durable structure provided.

The spokes 11 are of wood, and at their inner or hub ends are tapered at 12, and these tapered ends are beveled as indicated at 13, the bevels of each alternate spoke being in reverse directions, so that when the spokes are assembled, the broad side of one tapered end will be upon the outside of the wheel while the next adjacent spokes will have their narrow sides outermost and their wide portions upon the inner side of the wheel.

The spokes are assembled within the inexpansible metallic rim 10, and pressure is applied to the assembled spokes at their hub portions, the tapered and beveled ends being forced into alinement by hydraulic and other pressure and they become permanently wedged owing to the radial taper and reverse bevels. In wedging these ends together each spoke is given a slight radial movement, thereby forcing the outer ends of the spokes tightly into contact with the metallic rim.

If desired, the rim can be provided with caps 14 for receiving the outer ends of the spokes said caps being connected to the rim by spot welding, brazing or riveting.

Instead of the caps, however, the rim can be made with openings 15, to receive the tenons on the ends of the spokes, the metal of the rim being punched or drawn up into the channel portion as shown at 16, and providing suitable reinforcements and bearings around the tenons of the spokes, and in this punching process the shoulder of the opening 15 is curved or rounded at 17 and the tenons of the spokes are each formed with a corresponding fillet 18, thereby providing a perfectly tight joint between the spoke and rim.

In practice I have found that the hub portion of a wheel constructed as herein shown and described is exceedingly strong owing to the close binding contact of the tapered and wedged portions of the spokes, but in order to provide additional safety I arrange a metal plate or disk 19 upon the outside of the wheel, and connect each alternate spoke with said plate or disk by means of a rivet 20, passed through the inner side of the spoke, the head of the rivet being flush with the face of the spoke, and the opposite end of said rivet is headed down on the plate or disk 19, and it will be noted that the spokes through which the rivets pass are those which have their broad faces upon the inner side thereby making these wedge shaped ends practically integral with the plate or disk upon the outside, and preventing any possible movement of the alternate spoke ends which are held between each pair of riveted spokes and the plate.

The central portion of the plate is turned inwardly providing a sleeve 21 against which the ends of the spokes rest and this sleeve facilitates the placing and removal of the wheel upon the hub proper 22.

The disk 23 of this hub is shown with a brake drum 24 connected thereto but it will be understood that my improved wheel is adapted for use upon any type of hub either with or without a brake drum, and for the purpose of securely connecting my improved demountable wheel to the hub 22, I employ stud bolts 25 which are passed through the front plate and the end of the spokes into the disk of the hub. Any desired number of bolts may be employed. In the present construction I employ six bolts, and these pass through each alternate spoke, and the spokes through which the bolts are passed are those which are devoid of rivets.

In Fig. 5 I have shown a form of rim in which the spoke openings are provided with integral reinforcing edges, and to protect the inner tube against these portions, I employ a thin band 26, which is placed within the channel of the rim and has a reduced end 27 which fits into a recessed portion 28 in the opposite end and these end portions are arranged over a spoke hole and can be spot welded so as to hold the band to the rim.

It is obvious that so far as this particular type of rim is concerned, that any method of securing or uniting the spokes at the center of the wheel can be employed, and it will also be understood that other forms of protecting bands can be employed in connection with the rim.

While I have shown the sides or leg portions of the rim as straight and parallel it will be understood that they can be made inclined or diverging if desired, in fact the rim can be of any desired cross sectional shape so long as the central portion thereof extends inwardly or is of sufficient depth to receive the spoke ends and that the integral tire retaining flanges are so positioned with reference to each other and to the central portion as to permit the employment of the protecting band within the same. It will also be understood that other forms of protecting rings or bands may be employed.

A wheel constructed as herein shown and described is quickly and economically manufactured and is of exceeding strength at both the central and rim portions and can therefore be easily carried as an additional demountable wheel and all danger of impairment while being so carried is completely avoided by the inherent coacting strength of the parts from which the wheel is constructed.

Having thus described my invention, what I claim is:—

1. In an automobile wheel, a sheet metal rim having tire-retaining flanges and a central inwardly extending portion, said inwardly extending portion having radially outwardly projecting spoke receiving sockets produced therein.

2. In an automobile wheel, a sheet metal rim having tire-retaining flanges and a central inwardly extending portion having apertures produced therein, the edges of said apertures being turned radially and adapted to receive the ends of the spokes of the wheel, and a band arranged within the rim and spaced from the base of said inwardly projecting portion.

3. In an automobile wheel, a rim having tire-retaining flanges and a central inwardly extending portion having apertures, the edges of said apertures being turned radially outwardly, and a band spaced from the base of the inwardly extending portion, said band resting upon the rim.

4. In an automobile wheel, a rim having tire-retaining flanges and a central inwardly extending portion having apertures, the edges of said apertures being turned radially outwardly, and a band spaced from the apertured base of the inwardly extending portion, said band resting upon the rim and contacting with the outwardly turned edges of the base apertures.

In testimony whereof, I hereunto affix my signature.

JAMES H. WAGENHORST.